Jan. 1, 1963 J. E. P. DE DUBÉ 3,070,910
TROUSER HOLDER
Filed Oct. 23, 1959 9 Sheets-Sheet 1

Jan. 1, 1963  J. E. P. DE DUBÉ  3,070,910
TROUSER HOLDER
Filed Oct. 23, 1959  9 Sheets-Sheet 2

Jan. 1, 1963 J. E. P. DE DUBÉ 3,070,910
TROUSER HOLDER

Filed Oct. 23, 1959 9 Sheets-Sheet 4

Inventor:
Jan. E. P. de Dubé
By: Michael S. Striker
Atty

Jan. 1, 1963  J. E. P. DE DUBÉ  3,070,910
TROUSER HOLDER

Filed Oct. 23, 1959  9 Sheets-Sheet 5

Inventor:
Jan. E. P. de Dubé
By: Michael S. Striker
Atty

Jan. 1, 1963 J. E. P. DE DUBÉ 3,070,910
TROUSER HOLDER
Filed Oct. 23, 1959 9 Sheets-Sheet 6

Inventor:
Jen. E.P. De Dubé
By:
Michael S. Striker
Attorney

Jan. 1, 1963  J. E. P. DE DUBÉ  3,070,910
TROUSER HOLDER
Filed Oct. 23, 1959  9 Sheets-Sheet 8

Jan. 1, 1963 J. E. P. DE DUBÉ 3,070,910
TROUSER HOLDER
Filed Oct. 23, 1959 9 Sheets-Sheet 9

United States Patent Office 3,070,910
Patented Jan. 1, 1963

3,070,910
TROUSER HOLDER
Jan E. P. de Dubé, 6 Club Drive, Massapequa, N.Y.
Filed Oct. 23, 1959, Ser. No. 848,432
Claims priority, application Germany Oct. 28, 1958
2 Claims. (Cl. 38—71)

The present invention relates to a device for holding trousers.

One of the objects of the present invention is to provide a trouser holder which will support the legs of the trousers in stretched pressed condition.

Another object of the present invention is to provide a trouser holder which will stretch the legs of the trousers during placing of the trousers in the trouser holder.

A further object of the present invention is to provide a trouser holder of the above type which will stretch the legs of the trousers by urging upper and lower portions of the trouser legs away from each other.

An additional object of the present invention is to provide a trouser holder of the above type which will operate to reliably grip the trousers at the cuffs thereof while enabling the trousers to be easily adjusted and which will maintain the trousers reliably in their adjusted position while the trouser holder is actuated to stretch and press the legs of the trousers.

It is also an object of the present invention to provide a structure capable of accomplishing the above objects but at the same time also capable of properly supporting articles of clothing in addition to trousers.

It is also an object of the present invention to provide a structure which can accomplish the above objects and which at the same time is composed of simple ruggedly constructed elements which are very reliable in operation.

With the above objects in view the present invention includes in a trouser holder an elongated carrier plate having upper and lower ends and supported for turning movement about an axis extending transversely with respect to the carrier plate adjacent to the lower end thereof, this carrier plate being turnable from an idle position through an intermediate position to an operating position. Upper and lower pressure plates are respectively located adjacent the upper and lower ends of the carrier plate and extend transversely with respect to the latter so that a pair of trousers may be draped over the upper end of the carrier plate and be gripped between the pressure plates and the carrier plate with the bottom, cuff ends of the trouser legs gripped between the lower pressure plate and the carrier plate. The arrangement is such that at the intermediate position of the carrier plate only the lower pressure plate engages the latter while at the idle position of the carrier plate both of the pressure plates are out of engagement with the carrier plate and in the operating position of the carrier plate both of the pressure plates are capable of engaging the carrier plate. Thus, when the carrier plate is in its idle position a pair of trousers may be draped on the carrier plate over the upper end thereof with the cuff ends of the trousers legs at the elevation of the lower pressure plate. Then the carrier plate is turned to its intermediate position so that the lower ends of the trousers are gripped by the lower pressure plate but not by the upper pressure plate, and thus it is possible for the trousers to be adjusted on the upper end of the carrier plate, and at this upper end there is preferably located a material having a high coefficient of friction so that the trousers will be reliably maintain in their adjusted position. Thereafter, the carrier plate is turned beyond the intermediate position thereof to its operating position so that both of the pressure plates now press the trousers against the carrier plate. A spring means urges the pressure plates toward the carrier plate, and this spring means additionally operates to move the upper and lower pressure plates away from each other while the carrier plate approaches its operating position so that the trousers are not only pressed by the pressure plates against the carrier plate, but in addition the pressure plates by their movement apart from each other serve to stretch the trousers.

The novel features which are considered as characteristic for the invention are set forth in particular in the appended claims. The invention itself, however, both as to its construction and its method of operation, together with additional objects and advantages thereof, will be best understood from the following description of specific embodiments, when read in connection with the accompanying drawings, in which:

Figures 1, 12:
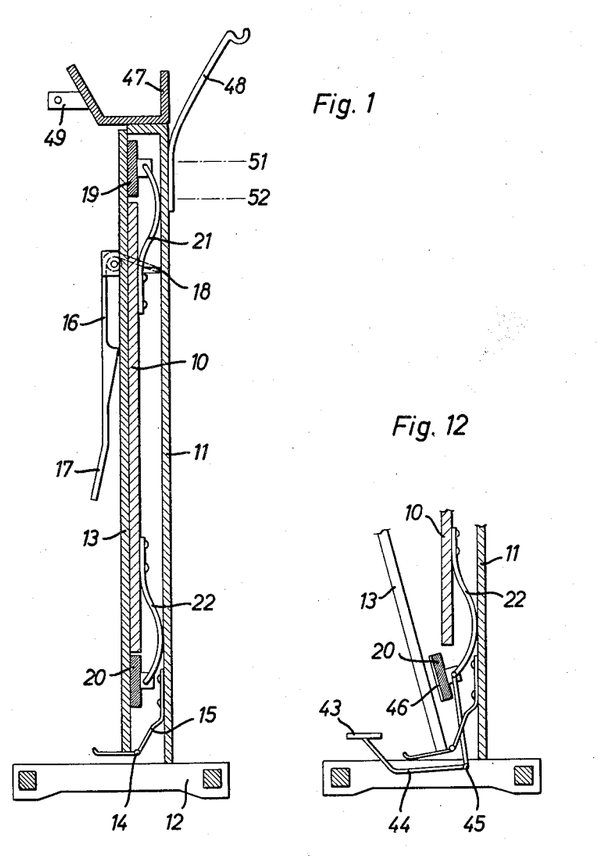
FIG. 1 is a sectional side elevation on a line corresponding to the line E—F of FIG. 4 of a trouser holder according to the present invention, the carrier plate being shown in FIG. 1 in its operating position.
FIG. 12 is a fragmentary sectional side elevation of a modification of the structure at the lower end of the trouser holder.

In FIGURE 1, a stationary plate is designated 10. This plate is mounted in a box-like housing 11 in a manner which will be explained hereinafter with reference to FIGURE 4. The box-like housing 11 is secured to a base member 12. A carrier plate, which is designated 13, is pivotally carried by a hinge 14 which is provided on an arm 15. The arm 15 is secured to the box-like housing 11. Also visible in FIGURE 1 is a pivoted lever 16 which has a handle 17 and which is connected through a resilient bar 18 to a second lever of similar construction which is not visible in FIGURE 1. This resilient bar will be discussed hereinafter with reference to FIGURE 4. At the moment, it may merely be stated that this resilient bar 18 is mounted on a member 34, which is secured to the plate 10 and which will be discussed with reference to FIGURE 4, in such a manner that the lever 16 and the second lever, which is constructed like the lever 16, can be pivoted jointly about the axis of the bar 18 as will be explained in more detail with reference to FIGURES 2 and 3. Finally, FIGURE 1 also shows an upper pressure plate 19 and a lower pressure plate 20. These two pressure plates are secured to the stationary plate 10 through a swing means formed by springs 21 and 22 respectively. Carrier plate 13 is shown in its operating position in FIG. 1.

Figure 2:
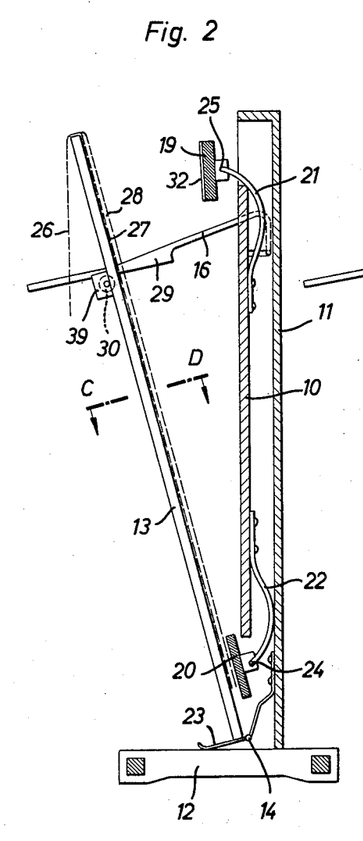
FIG. 2 shows the structure of FIG. 1 with the carrier plate in its idle position.

FIGURE 2 shows that the plate 13 can be swung about the pivot axis formed by the hinge 14 into an oblique idle position in relation to the fixed plate 10, if the lever 16 is turned about 90° in clockwise direction about the axis of the rod 18. The pivotal movement of the plate 13 in counterclockwise direction continues until a leg 23, through which the plate 13 is connected to the hinge joint 14, rests against the top of the foot member 12. During the movement of the plate 13 out of the operating position illustrated in FIGURE 1 into the idle position illustrated in FIGURE 2, the upper pressure plate 19 moves forwards out of the plane of the stationary plate 10 and downwards at the same time, while the lower pressure plate 20 likewise moves forwards out of the plane of the plate 10 and is raised at the same time as shown in FIGURE 2. Springs 21 have upper horizontally bent ends 25, and springs 22 have lower horizontally bent ends 24. The lower pressure plate 20 is secured to the springs 22 for pivoting about the ends 24. Likewise, the upper pressure plate 19 is secured to the springs 21 for pivoting about the ends 25.

When the carrier plate 13 is in the idle position shown in FIGURE 2, pressure plates 19 and 20 are spaced from plate 13, and the trousers to be pressed are placed on the plate 13 in the manner indicated by the dotted lines 26 to 28 in FIG. 2. The dotted line 26 represents the hip portion of the trousers, and the dotted lines 27 and 28 represent the two trouser legs. The lower cuff ends of the trouser legs extend down to the elevation of the lower plate 20 and are inserted between this lower pressure plate and the carrier plate 13.

Figure 3:
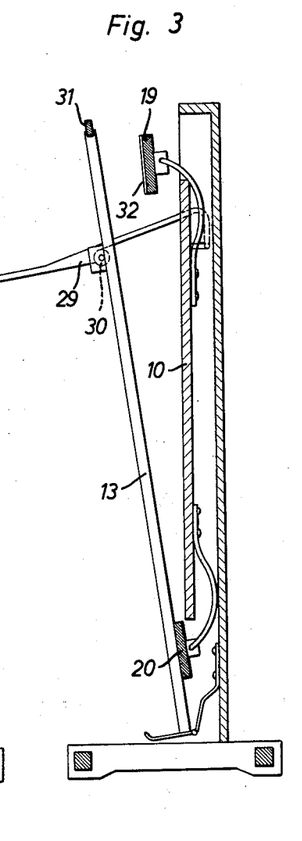
FIG. 3 shows the structure of FIGS. 1 and 2 with the carrier plate in an intermediate position.

If the plate 13 is now brought into its intermediate position between the end positions shown in FIGURES 1 and 2, as illustrated in FIGURE 3, the pressure clamping plate 20 is pressed against the plate 13 and therefore presses the lower ends of the trouser legs against the plate 13. Thus the pressure plate 20 with its spring 22 here represents the gripping device. The actual trousers are no longer illustrated in FIGURE 3 but are still on the plate 13 as was explained with reference to FIGURE 2. FIGURE 3, like FIGURE 2, shows that, during the pivoting of the plate 13 into the position illustrated in FIGURE 2, the lower plate 20 has not only moved out of the plane of the plate 10 but has also been displaced upwards at the same time in relation to the position illustrated in FIGURE 1. In this upwardly displaced position, the pressure plate 20 now presses the lower ends of the trouser legs against the plate 13. In the intermediate position of the carrier plate 13, which is illustrated in FIGURE 3, the plate 13 is held by projections 29 provided on the lever 16 and on the similar lever which is not illustrated in FIGURES 1 to 3. The projections 29 actually engage on rollers 30 which are secured at the two longitudinal edges of the plate 13 as will be explained with reference to FIGURE 7. In the position illustrated in FIGURE 3, the plate 13 is thus held so that the user of the trouser-press can now place the inserted trousers, the lower ends of which are held by the pressure plate 20, flat on the carrier plate 13 or smooth them out and pull them tight within certain limits, with both hands. At the same time, the user will ensure that the creases in the trouser-legs coincide with the existing creases. Since the plate 13 is held by the projections 29 in the intermediate position illustrated in FIGURE 3, it is possible to manipulate the trousers as described. This possibility of laying and smoothing out the trousers, which is not present to a similar satisfactory extent in the known trouser-presses, is further improved as a result of the fact that the upper edge of the plate 13 is roughened or that a strip 31 of a friction material such as rubber which adheres well to clothing material is inserted in the plate 13 at this point, as illustrated in FIGURE 3.

After the trousers have been draped on the plate 13 in the manner described and smoothed out thereon, the plate 13 is brought out of the position illustrated in FIGURE 3 back into the operating position illustrated in FIGURE 1 and is held in this position as a result of the fact that the lever 16 is turned back, in counterclockwise direction, into the position shown in FIGURE 1. During this pivotal movement of the plate 13, the inserted trousers very soon come into contact with the upper plate 19. The left-hand side of this plate 19 is covered with a material 32 which adheres well to clothing material, as illustrated in FIGURES 2 and 3, or it is itself roughened. Since the upper pressure plate 19, on turning of the plate 13 toward the plate 10, not only moves back into the plane of the stationary plate 10 but at the same time also executes an upward movement, and moreover since the lower pressure plate 20 not only moves back into the plane of the plate 10 but also executes a downward movement at the same time, the inserted trousers are stretched. This stretching is very effective because here a stretching is caused by the movement of both pressure plates (19 and 20) away from each other. The trousers now remain in the stretched state in the trouser holder until it is opened again.

Figures 4, 5, 6, 10, 19:
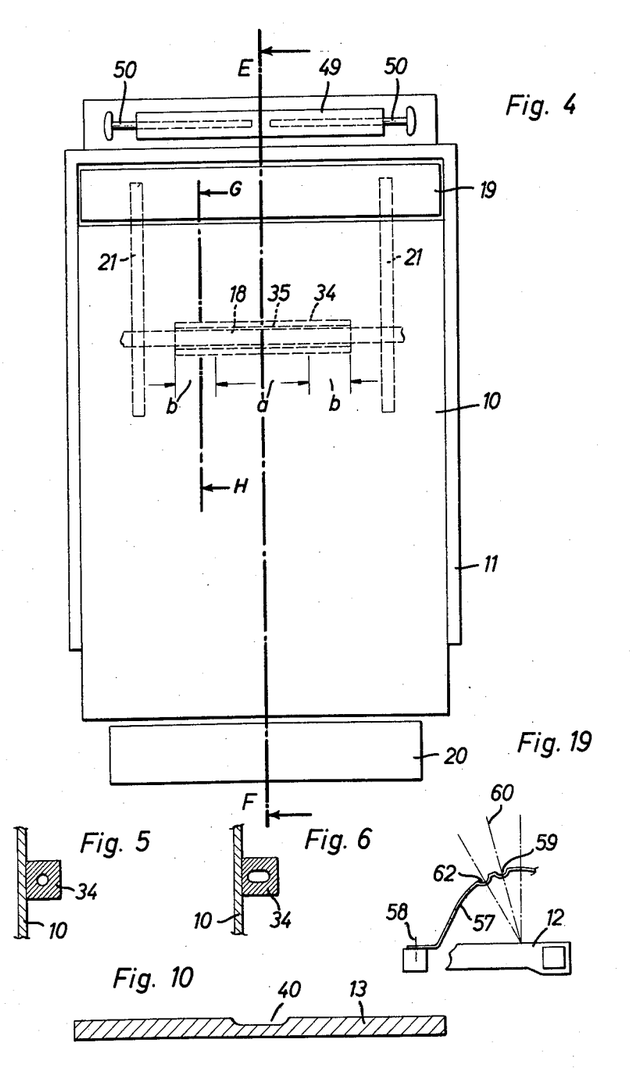
FIG. 4 is a front elevation of the trouser holder with the carrier plate removed.
FIGS. 5 and 6 are fragmentary sectional elevations on line G—H and line E—F respectively, of details of the structure of FIG. 4.
FIG. 10 is a sectional illustration of the carrier plates taken along line C—D of FIG. 2 in the direction of the arrows.
FIG. 19 illustrates a structure for holding the carrier plate in its different positions.

In FIGURE 4, the stationary plate 10 is shown seen from the front with the carrier plate 13 omitted. This figure shows that the plate 10 can be secured by its two vertical edges to the side walls of the box-like housing 11. The upper pressure plate 19 can be seen above the plate 10 in FIGURE 4. The lower pressure plate 20 is likewise seen, being illustrated in the position which it assumes when the trouser holder is closed. The upper pressure plate 10 is shown in FIGURE 4 in the position illustrated in FIGURE 1. The springs 21 for the upper pressure plate 19 are also drawn in FIGURE 4. At the same time, FIGURE 4 also shows that a member 34, in which the resilient bar 18 is mounted, is secured to the back of the stationary plate 10.

FIGURE 5 shows this member 34 in side elevation, in section along the line E—F in FIGURE 4. The member 34, which is drilled through its whole length, has a bore of circular cross-section in the section plane E—F. This bore extends, with a circular cross-section, substantially over the length designated by a in FIGURE 4.

Over the length b on both sides of the center portion of the member 34, the bore has an elongated cross-section, as shown in FIGURE 6 which represents a section along the plane G—H in FIGURE 4.

As an alternative to the mounting of the bar 18 in the member 34, it may be mentioned that a rubber sleeve or a sleeve of another resilient material may be provided over the length a in the member 34, as indicated at 35 in FIGURE 4.

Figure 7:
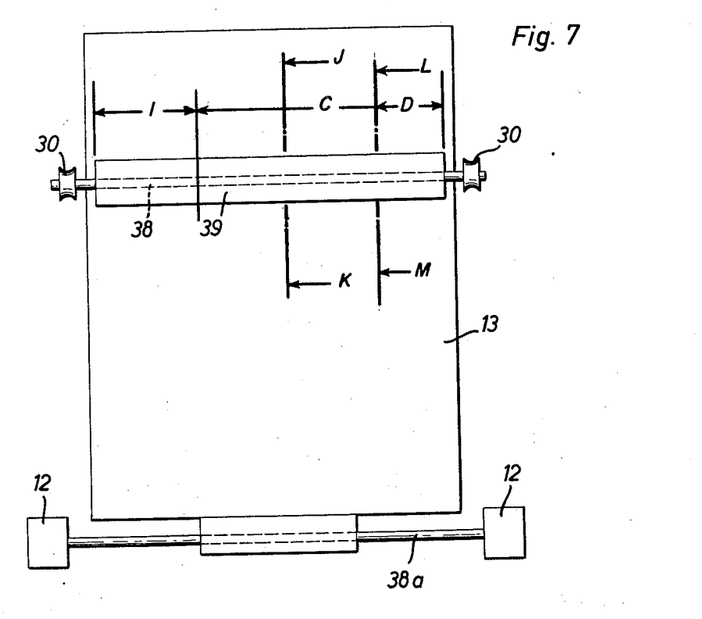
FIG. 7 is a front elevation of the carrier plate by itself.

FIGURE 7 shows the carrier plate 13 seen from the front with the omission of all the other components of the trouser holder but illustrating a modified form of the bearing arrangement for pivoting this plate. This carrier plate 13 is provided at its two vertical edges with the rollers 30 which have already been mentioned with reference to FIGURES 2 and 3 and on which the projections 29 act. The rollers 30 are secured to a continuous spindle 38. The spindle 38 is mounted in a reinforcing member 39 provided on the plate 13. A springy rod 38a, which extends into the foot member 12 on both sides, serves to mount the plate 13 in FIGURE 7. The rod 38a is a resilient rod whereby the turnable plate 13 is self-adjusting, i.e., due to the resiliency of rod 38a it is made possible to press trousers of any thickness.

Figure 8:
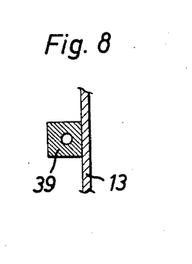
FIGS. 8 and 9 are fragmentary sectional details on line J—K and line L—M respectively of the structure of FIG. 7.
Figures 9, 11:
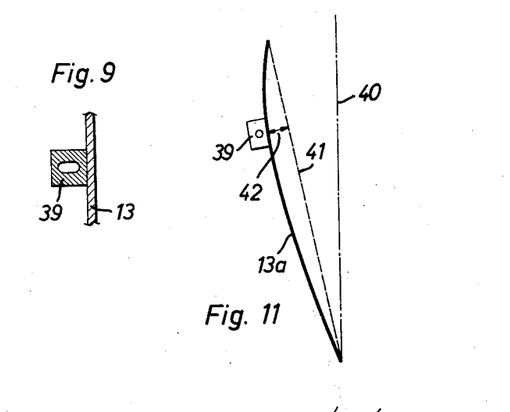
FIG. 11 is a diagrammatic illustration of a modified form of the structure of the invention.

This reinforcing member 39 should likewise be constructed in a similar manner to that of the member 34 already described with reference to FIGURES 4 to 6. This means that the member 39 comprises a circular aperture in the section plane J—K extending over the length c in FIGURE 7, as illustrated in FIGURE 8, and an elongated aperture in the section plane L—M extending over the length d on both sides of the center portion c of the member 39 as shown in FIGURE 9. The sectional illustrations in FIGURES 8 and 9 are again side views of the plate 13 in the said section planes.

The spindle 38 and hence the rollers secured thereto can yield, as a result of the construction shown in FIGURES 7 to 9, when the levers 16 are brought into the position shown in FIGURE 1. This resilience of the spindle 38 may be sufficient in certain circumstances, so that the bar 18 does not need to be resilient.

FIGURE 10 shows in section along C—D in FIGURE 2 that the plate 13 is provided with a groove 40 which renders it possible to lay the trousers flat on the right-hand side of the plate 13 in FIGURE 2 although the thickness of material laid out at the trouser seams is double the thickness of material at the other parts of the trousers.

A tie (knot or bow) may also be inserted in the groove 40 before the trouser-press is closed and so likewise pressed.

FIGURE 11 shows another embodiment of the invention. In order to simplify the drawing, the stationary plate 10 is represented only by the vertical chain line 40 in FIGURE 11 and the only other part of the whole trouser holder shown is the carrier plate 13a. The alternative illustrated in FIGURE 11 differs from the embodiment previously described in that the carrier plate is not flat as in the embodiment described above but is curved so that it has a gentle concave surface directed towards the stationary plate 10. This curve of the concave surface is selected in such a manner that the apex of the curved plate 13a is substantially at the position of the reinforcing member 39 in FIGURE 7 and that at this point, the distance 42 between the chord 41 shown in dotted lines and the curved plate 13a is of the order of magnitude of a few millimeters to about 1 cm. This curvature of the plate 13a disappears when the trouser holder is in the state illustrated in FIGURE 1, that is to say when the trousers have been placed in the holder and the holder itself is closed. The purpose of this curvature is to provide additional assurance that the trouser legs are pressed against the stationary plate 10 with substantially the same pressure over their whole length. As already mentioned, the curvature is very slight and is intended only to prevent a very slight concave curvature of the plate 13a towards the left when the trouser holder is in the position shown in FIGURE 1, that is to say in the closed position, which would lead to the trouser legs being pressed against the stationary plate 10 substantially only midway along their length, while appreciably less pressure would be exerted at the upper and lower ends of the trouser legs so that the trousers would not be sufficiently evenly pressed.

It will now be shown, with reference to FIGURE 12, that the lower pressure plate 20 can not only be pressed against the carrier plate 13 by means of the force of the springs 22 as described above, so gripping the lower ends of the trouser legs, but that this gripping of the lower ends of the trouser legs can also be brought about by means of a pedal 43. This pedal 43 is mounted on an arm 44 in a pivot 45 and presses the lower pressure plate 20, the front face of which may again be covered with a clinging material or with rubber 46 as in the case of the pressure plate 19, against the plate 13 in such a manner that the lower ends of the trouser legs are again pressed against the plate 13. If desired, the plate 20 in FIGURES 1 to 3 may also be provided with such a covering.

Further improvements to the trouser-press described consist in that an open container 47 (FIG. 1) for keeping cuff-links, tie-pins and the like is provided at the top of the box-like housing 11, that there is an arm 48 at the top of the housing 11 on which to hang a coat-hanger, and that two rods 50, shown in FIGURE 4, can be pulled out of a handle 49 which is provided on the container 47 and serve to carry underwear.

The arm 48, which may also be in one piece with a coat-hanger, is adjustable by means of two threaded bolts which are indicated by the dotted lines 51 and 52 in FIGURE 1 and which pass through slots in the arm 48 and by means of wing-nuts or the like on the threaded bolts.

Figure 13:
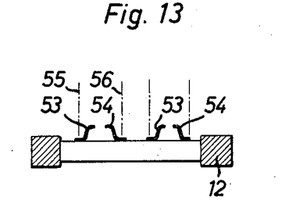
FIG. 13 is a front sectional elevation of shoe holding structure.
Figure 14:
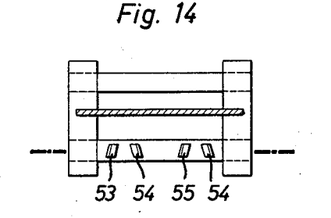
FIG. 14 is a top plan of the structure of FIG. 13.
Figure 15:
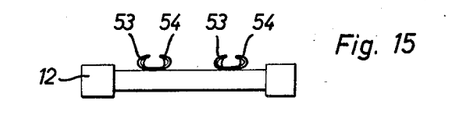
FIG. 15 is a front elevation of another form of shoe holder.
Figure 16:
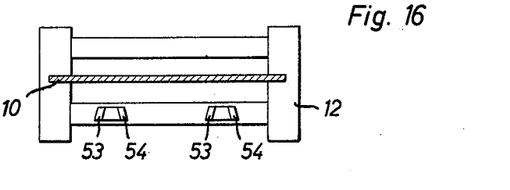
FIG. 16 is a top plan of the structure of FIG. 15.

A device constructed in the manner of the bindings of a ski and consisting of the clips 53, 54 for the insertion of a shoe in each may be secured, for example by means of screws 55, 56, to the foot member 12, as shown in FIGURES 13 and 14 which illustrate the foot member seen from the front and from above. The clips 53, 54 may also be in one piece as shown in FIGURE 15 from the front and in FIGURE 16 from above. The shoes are inserted in the clips shown in FIGURES 13 to 16, only part of the sole being supported in the clips while the insteps and heels do not require any support.

Figure 17:
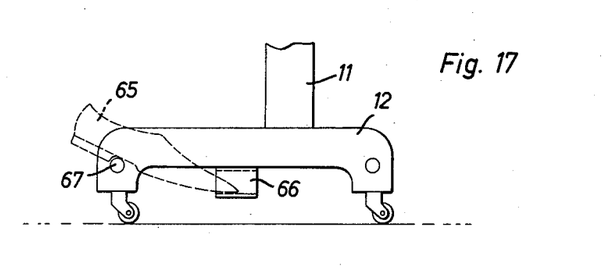
FIG. 17 is a fragmentary side elevation of another embodiment of a shoe holding structure incorporated into the trouser holder of the invention.
Figure 18:
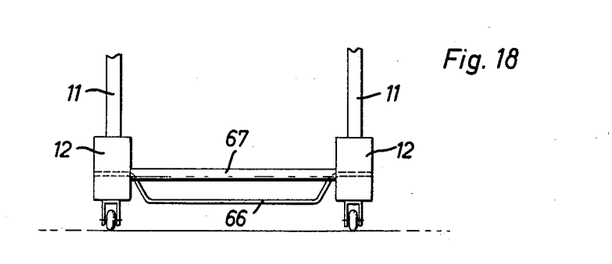
FIG. 18 is a front elevation of the structure of FIG. 17.

FIGURES 17 and 18 show, in side elevation and front elevation, a device for keeping shoes which is modified in comparison with FIGURES 13 to 16. The front portions of the shoes rest on a bracket 66 which is secured underneath the foot member 12, and the heels 65 rest on a bar 67 which may conveniently be provided with a rubber covering.

Figure 20:
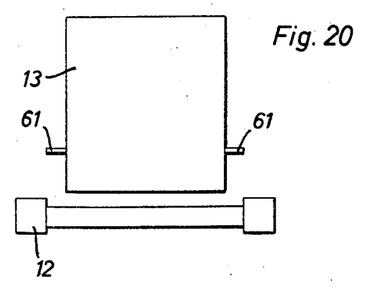
FIG. 20 illustrates a carrier plate which is adapted to cooperate with the structure of FIG. 19.

FIGURE 19 shows another means of locking the plate 13 in the intermediate position, which may replace the projections 29 cooperating with the rollers 30. These other means consist of two springs 57 each of which may be secured by means of a screw 58 to the foot member 12 and in the depressions 59 in which, two pins 61 which are secured to the longitudinal edges of the plate 13 (FIGURE 20) can engage in the intermediate position of the pivoted plate 13 which is indicated by the line 60. When the plate 13 is in the idle position shown in FIGURE 2, these pins 61 engage in the depressions 62 so that the legs 23 in FIGURE 2 can be dispensed with.

Figure 21:
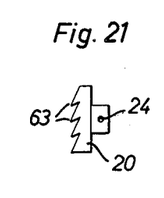
FIG. 21 shows details of one of the pressure plates of the trouser holder.

The pressure plate 20 may also be provided with teeth 63 as shown in FIGURE 21 instead of with a covering which adheres well to clothing material or instead of a rubber covering.

Figure 22:
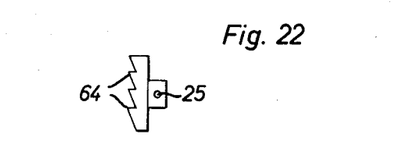
FIG. 22 shows details of the other of the pressure plates of the trouser holder.

A similar construction is illustrated in FIGURE 22 for the upper pressure plate 19. The teeth 64 of the upper pressure plate must naturally be orientated in the opposite direction to those of the lower plate 20.

Figure 23:
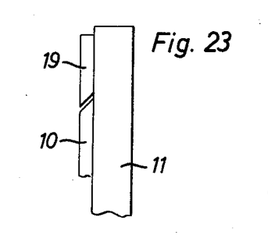
FIG. 23 is a fragmentary side elevation illustrating the cooperation of the upper pressure plate and a stationary plate of the trouser holder.

FIGURE 23 shows, in side elevation, that the lower edge of the upper pressure plate 19 and the upper edge of the stationary plate 10 may be chamfered which is an advantage because, on closing the trouser holder, the upper pressure plate does not move into the plane of the plate 10 perpendicularly to said plane but rather obliquely to the plane of the stationary plate 10.

Figure 24:
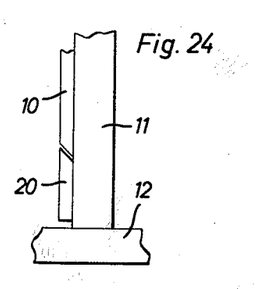
FIG. 24 is a fragmentary side elevation illustrating the cooperation of the lower pressure plate with this stationary plate.

In the side elevation shown in FIGURE 23, the plate 19 is illustrated when the trouser holder is in the closed condition, that is to say in the condition shown in FIGURE 1, and in FIGURE 24 the lower pressure plate 20 is shown, to which similar considerations apply and which should therefore likewise be chamfered.

Figure 25:
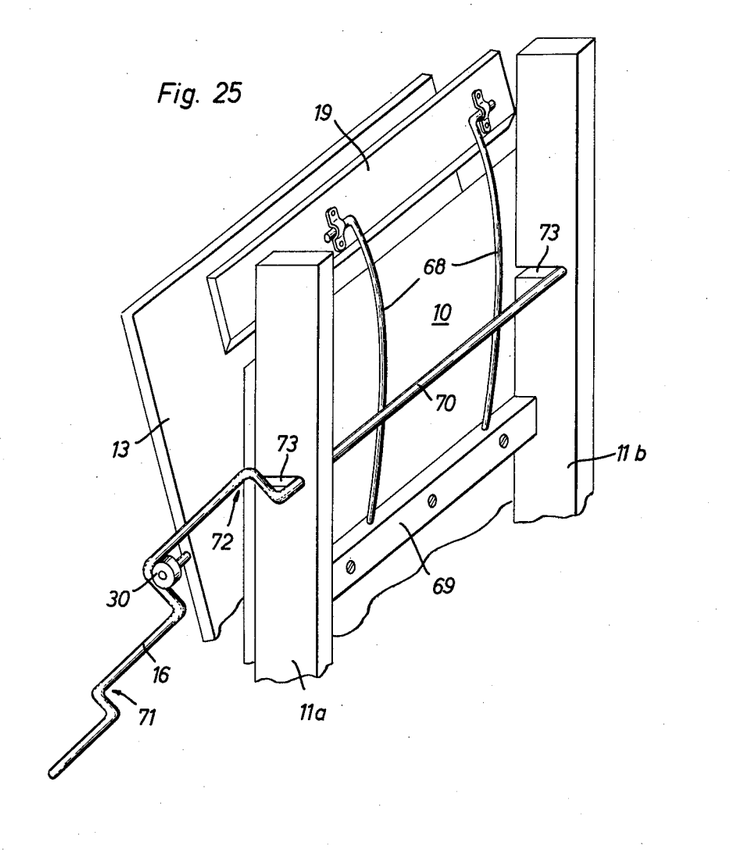
FIG. 25 is a fragmentary perspective illustration of the spring means which cooperates with the upper pressure plate as well as the lever means which cooperates with a carrier plate for moving the latter.

FIGURE 25 shows, in perspective, modification of the construction shown in FIGURES 1 to 4 of the springs 21 for the upper clamping plate 19 and the mounting of the bar 18 which joins the two bent levers 16. FIGURE 25, in which the box-like housing 11 of FIGURES 1 to 3 is replaced by two uprights 11a and 11b, again shows the stationary plate 10, the upper pressure plate 19 and the carrier plate 13 in its intermediate position. The rollers 30 are mounted directly on the sides of carrier plate 13. The two pivoted levers 16 are stepped as shown in FIG. 25.

FIGURE 25 further shows that the upper pressure plate 19 is mounted on the stationary plate 10 by means of two resilient spring rods 68 instead of the springs 21 in FIGURES 1 to 3. These springs 68 are fixed at their lower ends to a beam 69 which is mounted on the stationary plate 10 below the rod 70 which joins the two levers 16 together.

When the trouser holder is in the fully open state, the rollers 30 rest at the steps 71 on the bent levers 16 and when the trouser holder is in the closed state, at the steps 72.

When the carrier plate 13 is changed over to the fully closed position of the trouser holder, the pressure plate 19 is moved upwards as these resilient rods 68 are pushed against bar 70, so that the inserted trousers are stretched. In addition when the trouser holder is again brought into the intermediate position illustrated in FIGURE 3 and the pressure plate 19 begins to move out of the plane of the stationary plate 10, the springs 68 assist the movement of the carrier plate 13 so that the holder begins to open as soon as the pivoted levers 16 are pivoted in clockwise direction about the axis of the rod 70, that is to say that the trouser holder goes automatically into the half-open position as soon as the pivoted levers 16 are actuated in clockwise direction.

Figure 26:
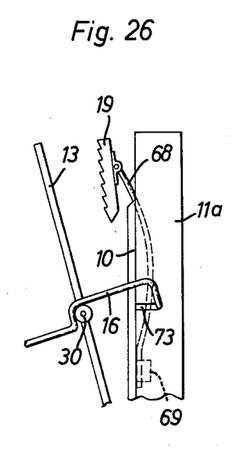
FIG. 26 is a side elevation of the structure of FIG. 25.

In FIGURE 26, the structure of FIGURE 25 is illustrated in the half-open position, seen from the side with carrier plate 13 in its intermediate position. This figure shows, in particular, that the pressure plate 19 not only moves out of the plane of the stationary plate 10 but is also lowered at the same time.

Figure 27:
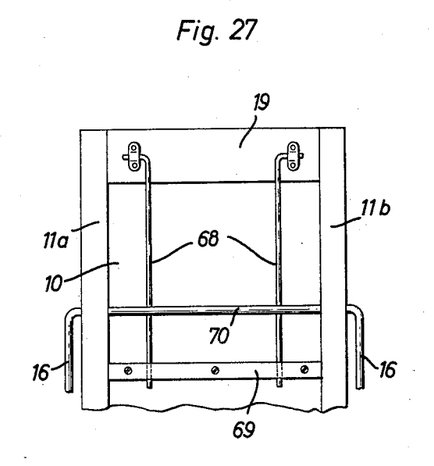
FIG. 27 is a rear elevation of the structure of FIG. 25.

In FIGURE 27, the trouser holder is illustrated in the closed state, seen from the back. It will be seen that the pressure plate 19 has been raised as the press was closed.

Figure 28:
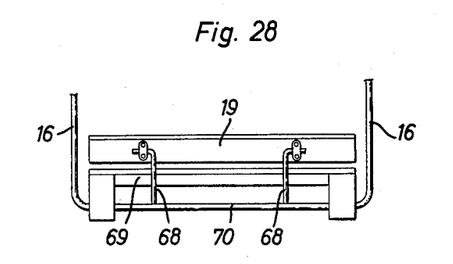
FIG. 28 is a top plan of the structure of FIG. 25.

FIGURE 28 shows, seen from above, that during the opening of the trouser holder, the pressure plate 19 has moved out of the plane of the stationary plate 10.

In the embodiment shown in FIGURES 25 to 28, it is therefore no longer necessary to construct the rod 70 resiliently as was necessary for the bar 18 in FIGURES 1 to 3. Moreover, the rod 70 may be mounted in a very much simpler manner, than that described for the bar 18 with reference to FIGURE 4.

Figures 29, 30:
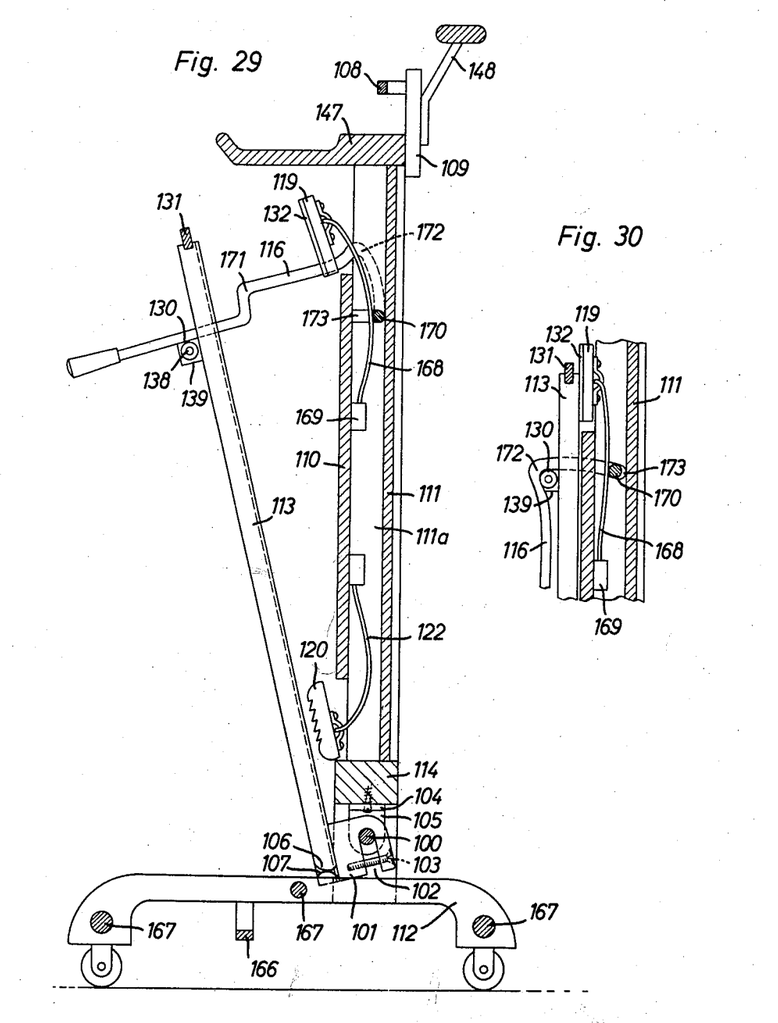
FIG. 29 is a sectional side elevational view of a somewhat modified trouser holder of the invention.
FIG. 30 is a fragmentary sectional side elevation showing part of the structure of FIG. 29 in a position different from that illustrated in FIG. 29.

Referring now to FIGURES 29 and 30, there is illustrated therein a further embodiment of the structure of the invention, the embodiment of FIGS. 29 and 30 including several of the features which have been described above as well as additional features which have not been described above. Referring to FIG. 29, the trouser holder illustrated therein includes a support means made up in part of the base 112 which is supported on suitable casters and which has at its ends a pair of bars 167 the left one of which cooperates with the rack 166 to serve as a shoe supporting structure in the manner described above in connection with FIGS. 17 and 18.

A pair of side walls 111a, one of which is visible in FIG. 29, extend upwardly from the base member 112 to serve as a support means therewith and these side walls are interconnected by a rear wall 111. The stationary plate 110 is fixed to the side walls 111a at the front edges of the latter and extends between the side walls 111a, and these side walls 111a are formed with the elongated horizontally extending cutouts 173 which are in the form of notches extending inwardly from the left edges of the side walls 111a, as viewed in FIG. 9. At their top ends the walls 111a are interconnected by the member 147 which is recessed at its top surface to serve as a receptacle for tie clips and the like, and the rear wall 109 is fixed to the rear of the member 147 and carries a rack 108 for any suitable articles of clothing. Also, the member 148 is fixed to and extends upwardly from the wall 109 and is fixed with a coat hanger, in the manner described above.

In the embodiment of FIG. 29, the side walls 111a are also interconnected by a transverse member 114 which is fixed to the side walls 111a and located at the bottom end of the rear wall 111. It will be noted that the upper edge of stationary plate 110 is spaced considerably below the element 147 and the lower edge of the stationary wall 110 is spaced considerably above the member 114. A pair of angle plates 104 are fixed to the under side of the member 114 adjacent to the side walls 111a, and each of these angle plates 104 has a downwardly directed ear 105. An elongated springy bore 100, similar to the springy rod 38a described above in connection with FIG. 7, extends between the downwardly directed members 105 and is supported at its ends in openings of these ears 105 so that the springy rod 100 is turnably supported by the angle plates 104 and at the same time is capable of yielding so as to become bowed to the left, as viewed in FIG. 29 described below.

The turnable carrier plate 113 in the embodiment of FIG. 29 is fixed at its right face, as viewed in FIG. 29, adjacent its lower end to an elongated rigid member 101 which may be integral with the plate 103 and which is formed with an elongated cutout 102 extending the entire length of the member 101 upwardly from the bottom face thereof so that the springy rod 100 can be received within the cutout 102 in the manner illustrated in FIG. 29. Member 101 is somewhat shorter than the distance between the ears 105 and is spaced centrally therebetween so that beyond the member 101 the springy rod 100 has portions of substantial length extending between the ends of the member 101 and the ears 105, so that the member 101 can shift to the left, for example, as viewed in FIG. 29, during yielding of the springy rod 100. A series of screws 103 are distributed along the member 100 extending across the gap 102 and pulling the portion of member 101 at the right of the gap 102 toward the portion of member 101 at the left of the gap 102, so that in this way the member 101 and thus the carrier plate 113 is tightly clamped onto the rod 100 so that the turning of the latter on the ears 105 supports the carrier plate 113 for turning movement about the axis of the rod 100 which is located adjacent the lower end of the carrier plate 113 and extends transversely thereof.

The carrier plate 113 is notched at its lower corners and has downwardly directed curved surfaces 106 which are located over the top faces of the side portions of the base 112, and these top faces respectively carry small rubber pads 107 which are engaged by the surfaces 106 at the notched corners of the carrier plate 113, so that these surfaces 106 cooperate with the pads 107 to locate the carrier plate 113 in the idle position thereof illustrated in FIG. 29. This carrier plate 113 in addition carries at its left face, as viewed in FIG. 29 an elongated axially bored member 139 which carries the shaft 138 on which the rollers 130 are turnable, these rollers being located just beyond the side edges of the plate 113 in the manner described above in connection with FIG. 7.

A pair of springs 122 are carried by a member which is fixed to the rear surface of the stationary plate 110, and at their bottom ends these springs 122 have horizontally extending free end portions over which a pair of straps extend, these straps being fixed to the rear surface of the lower pressure plate 120 so that the latter is turnably carried by the lower ends of the springs 122 in the manner described above. Also, the member 110 fixedly carries at its rear surface the support member 169 on which the springs 168 are fixed, these springs 168 extending upwardly from the member 169 and being turnably connected at their top ends to the rear surface of the upper pressure plate 119, in the manner shown most clearly in the FIG. 25 and also described above. The pressure plate 119 is provided at its left surface, as viewed in FIG. 29 with a sheet 132 of a material having a high coefficient of friction.

The elongated rod 170 extends between and through the elongated cutouts 173 of the side wall members 111a and at its free ends which are located beyond the cutouts 173 and the side wall members 111a the rod 170 is fixed to the levers 116 which formed a lever means locating the plate 113 in its several positions. As is apparent from FIG. 29, the lever means 116 is provided with a stepped portion 172 as well as with a second stepped portion 171. When the lever means 116 is turned to the position illustrated in FIG. 29, the carrier plate 113 by gravity automatically assumes the position illustrated in FIG. 29, and this is the idle position of the carrier plate 113, the presure plates 119 and 120 being spaced from the carrier plate 113 in this position of the parts. As was pointed out above, in this position the trousers can be draped over the upper end of the carrier plate 113 with the bottom, cuff end of the trouser legs located at the elevation of the pressure plate 120 between the latter and the carrier plate 113. Now the carrier plate 113 is turned in a clockwise direction, as viewed in FIG. 29, to its intermediate position where the rollers 130 are held by the steps 171 of the pair of levers 116. This turning of the carrier plate 113 to its intermediate position can be brought about simply by exerting a downward pressure on the free left ends of the levers 116 so that these will turn in a counter clockwise direction, as viewed in FIG. 29, and the rollers 130 will thus be forced to turn to the right, as viewed in FIG. 29, until these rollers snap into the steps 171 and thus the lever means 116 will hold the carrier plate 113 in its intermediate position. In this position the lower ends of the trouser legs will be gripped between the pressure plate 120 and the carrier plate 113, while at the same time the upper pressure plate 119 is still spaced from the carrier plate 113, so that the trousers can be very easily adjusted, and as was pointed out above in connection with FIG. 3, a suitable strip of friction material 131, which may be of rubber or any other suitable material having a high coefficient of friction, may be located on the top end face of the plate 113 to frictionally engage the fabric of the trousers and hold the latter in their adjusted position. Once the trousers have been adjusted, the operator turns the levers 116 further in a counterclockwise direction until these levers have the position indicated in FIG. 30. It will be noted that during the approach of the carrier plate 113 to its operating position illustrated in FIG. 13, the curved springs 122 tend to straighten out so that the lower presure plate 120 moves downwardly, and at the same time the curved springs 168 are pushed against the rod 170 so that these springs 168 also straighten out to a degree greater than that illustrated in FIG. 29, and thus the pressure plate 119 moves upwardly. As a result of this upward movement of the plate 119 and the downward movement of the plate 120 the trousers are not only pressed by the spring means 122, 168 against the carrier plate 113 through the presure plate 119 and 120, but in addition the trousers are longitudinally stretched at their legs.

As is particularly apparent from FIG. 30, the distance between the rod 170 and the step 172 of the lever means 116 is less than the distance from the right end of each cutout 173 to the rollers 130, so that when the parts have the position illustrated in FIG. 30 the rod 170 is displaced to the left from the ends of the cutouts 173 and the springs 168 are pressing against the rod 170 so as to maintain the trousers in their pressed, stretched condition.

Moreover, it will be noted that when the carrier plate 113 is turned to its operating position, the force of the springs 122 urging the lower pressure plate 120 to the left, as viewed in FIG. 29, will act also on the springy rod 100 through the carrier plate 113 and the member 101 to tend to pull the central portion of the springy rod 100 to the left, as viewed in FIG. 29, and thus the springy rod 100 and the springs 122 oppose each other in a manner which enables the springy rod 100 to participate also in the urging of the carrier plate 113 toward the pressure plates 119 and 120, and in fact, the springy rod 100 is deformed somewhat when the carrier plate 113 is in its operating position with the central portion of the springy rod 100 actually pulled slightly to the left from the position illustrated in FIG. 29.

It is apparent, therefore, that with the above-described structure of FIGS. 29 and 30, the springy rod 100 serves not only to turnably carry the carrier plate 113 for turning movement between its several positions, but in addition this springy rod 100 participates in the pressing of the carrier plate and the pressure plates together. Also, the lever means 116 cooperates with the springs 168 so that through the pressure of the rod 170 on the springs 168 not only is the plate 119 pressed against the plate 113, but in addition the plate 119 is moved upwardly to effect a stretching of the trousers, and in the same way the plate 120 moves downwardly during the straightening of the springs 122. Furthermore, when the lever means 116 is turned from the position of FIG. 30 to that of FIG. 29, the springs 168 will cause the plate 113 to snap rapidly toward the position thereof illustrated in FIG. 29. The coaction of the rod 170 with the springs 168, as illustrated in FIG. 30, makes a precision of the turnable mounting of the rod 170 and the cutout 173 unnecessary and at the same time provides a reliable forceful holding of the parts in the position illustrated in FIG. 30.

It will be understood that each of the elements described above, or two or more together, may also find a useful application in other types of trouser holders differing from the types described above.

While the invention has been illustrated and described as embodied in trouser holders which hold and stretch the trousers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a trouser holder, in combination, an elongated carrier plate having upper and lower ends and adapted to support a pair of trousers draped over said upper end of said carrier plate; means supporting said carrier plate for turning movement about an axis extending transversely with respect to said carrier plate and located adjacent said lower end thereof between an idle position, an operating position, and an intermediate position between said idle and operating positions; upper and lower pressure plates extending transversely with respect to said carrier plate and respectively located adjacent said upper and lower ends thereof, said pressure plates respectively having rest positions located in the path of turning movement of said carrier plate to its operating position, both of said pressure plates when they are in their rest positions being spaced from said carrier plate when the latter is in its rest position so that in said rest positions of said plates a pair of trousers may be conveniently placed on said carrier plate draped over said upper end thereof with the cuffs of the trousers located at the elevation of said lower pressure plate, only said lower pressure plate engaging said carrier plate when the latter is in its intermediate position so that the cuffs of the trousers will be gripped when said carrier plate is in its intermediate position to enable the trousers to be adjusted on said carrier plate while the cuffs of the trousers are thus gripped; and spring means cooperating with said pressure plates for yieldably maintaining the latter in said rest positions thereof and for resiliently resisting movement of the latter from said rest positions thereof so that during movement of said carrier plate to its operating position said pressure plates will be moved in opposition to said spring means to be pressed by the latter against said carrier plate for pressing the trousers thereagainst, said spring means also moving said lower pressure plate downwardly away from said upper pressure plate and simultaneously moving said upper pressure plate upwardly away from said lower pressure plate during movement of said carrier plate to its operating position so that the trousers will not only be pressed by said pressure plates against said carrier plate but in addition the trousers will be stretched between the pressure plates; and pedal means cooperating with said lower pressure plate for pressing the same against said carrier plate.

2. In a trouser holder, in combination, an elongated carrier plate having upper and lower ends and adapted to support a pair of trousers draped over said upper end of said carrier plate; means supporting said carrier plate for turning movement about an axis extending transversely with respect to said carrier plate and located adjacent said lower end thereof between an idle position, an operating position, and an intermediate position between said idle and operating position; upper and lower pressure plates extending transversely with respect to said carrier plate and respectively located adjacent said upper and lower ends thereof, said pressure plates respectively having rest positions located in the path of turning movement of said carrier plate to its operating position, both of said pressure plates when they are in their rest positions being spaced from said carrier plate when the latter is in its rest position so that in said rest positions of said plates a pair of trousers may be conveniently placed on said carrier plate draped over said upper end thereof with the cuffs of the trousers located at the elevation of said lower pressure plate, only said lower pressure plate engaging said carrier plate when the latter is in its intermediate position so that the cuffs of the trousers will be gripped when said carrier plate is in its intermediate position to enable the trousers to be adjusted on said carrier plate while the cuffs of the trousers are thus gripped; and spring means cooperating with said pressure plates for yieldably maintaining the latter in said rest positions thereof and for resiliently resisting movement of the latter from said rest positions thereof so that during movement of said carrier plate to its operating position said pressure plates will be moved in opposition to said spring means to be pressed by the latter against said carrier plate for pressing the trousers there-against, said spring means also moving said lower pressure plate downwardly away from said upper pressure plate and simultaneously moving said upper pressure plate upwardly away from said lower pressure plate during movement of said carrier plate to its operating position so that the trousers will not only be pressed by said pressure plates against said carrier plate but in addition the trousers will be stretched between the pressure plates.

References Cited in the file of this patent

UNITED STATES PATENTS

| | | |
|---|---|---|
| 1,387,395 | Harper | Aug. 9, 1921 |
| 1,885,803 | Corby | Nov. 1, 1932 |
| 2,499,109 | Read | Feb. 28, 1950 |
| 2,626,091 | Requitti | Jan. 20, 1953 |

FOREIGN PATENTS

| | | |
|---|---|---|
| 10,624 | Great Britain | May 7, 1906 |
| 197,163 | Great Britain | May 10, 1923 |
| 199,687 | Great Britain | June 22, 1923 |
| 335,748 | Great Britain | Oct. 2, 1930 |
| 183,971 | Switzerland | Dec. 16, 1936 |
| 785,811 | Great Britain | Nov. 6, 1957 |